United States Patent
Driscoll

Patent Number: 6,116,064
Date of Patent: Sep. 12, 2000

[54] TELESCOPING MOTORCYCLE HELMET LOCK

[76] Inventor: Donald Driscoll, 207 Cornwall Dr., Pittsburgh, Pa. 15238

[21] Appl. No.: 09/345,844

[22] Filed: Jul. 1, 1999

[51] Int. Cl.[7] .................................................. E05B 69/00
[52] U.S. Cl. .................................................. 70/59; 70/58
[58] Field of Search .................. 70/59, 14, 58, 70/209, 226, 18, 19

[56] References Cited

U.S. PATENT DOCUMENTS

| | | | |
|---|---|---|---|
| 3,762,191 | 10/1973 | Smith | 70/59 X |
| 3,831,407 | 8/1974 | Coleman | 70/59 X |
| 3,837,545 | 9/1974 | Rogers, Jr. | 70/59 X |
| 4,024,738 | 5/1977 | Pi | 70/59 |
| 4,063,637 | 12/1977 | Danforth | 70/59 X |
| 4,438,877 | 3/1984 | Jackson | 70/58 X |
| 4,766,616 | 8/1988 | Donahue | 70/59 X |
| 5,619,873 | 4/1997 | Wood | 70/226 X |
| 5,664,444 | 9/1997 | Schaan | 70/59 X |

FOREIGN PATENT DOCUMENTS

| | | | |
|---|---|---|---|
| 2370622 | 7/1978 | France | 70/59 |
| 7511168 | 3/1977 | Netherlands | 70/59 |

OTHER PUBLICATIONS

Popular Science, Doty, Wordless Workshop, p. 121, Nov. 1981.

*Primary Examiner*—Suzanne Dino Barrett

[57] ABSTRACT

A helmet restraining and locking device is provided including a plurality of rigid, semi-circular portions each defined by a section of a full sphere. The semi-circular portions have an extended orientation defining a hemispherical cover and an open retracted orientation. A mounting strap is provided for securing the semicircular portions on a motorcycle. Also included is a locking assembly for preventing unauthorized access under the hemispherical cover.

7 Claims, 2 Drawing Sheets

TELESCOPING MOTORCYCLE HELMET LOCK

BACKGROUND OF THE INVENTION

1. Field of the Invention

The present invention relates to helmet locks and more particularly pertains to a new telescoping motorcycle helmet lock for preventing the theft of a motorcycle helmet from a parked motorcycle.

2. Description of the Prior Art

The use of helmet locks is known in the prior art. More specifically, helmet locks heretofore devised and utilized are known to consist basically of familiar, expected and obvious structural configurations, notwithstanding the myriad of designs encompassed by the crowded prior art which have been developed for the fulfillment of countless objectives and requirements.

Known prior art helmet locks include U.S. Pat. No. 4,438,877; U.S. Pat. No. 4,063,637; U.S. Pat. No. 4,274,271; U.S. Pat. No. 4,733,805; U.S. Pat. No. 3,399,855; and U.S. Pat. No. 2,032,591.

In these respects, the telescoping motorcycle helmet lock according to the present invention substantially departs from the conventional concepts and designs of the prior art, and in so doing provides an apparatus primarily developed for the purpose of preventing the theft of a motorcycle helmet from a parked motorcycle.

SUMMARY OF THE INVENTION

In view of the foregoing disadvantages inherent in the known types of helmet locks now present in the prior art, the present invention provides a new telescoping motorcycle helmet lock construction wherein the same can be utilized for preventing the theft of a motorcycle helmet from a parked motorcycle.

The general purpose of the present invention, which will be described subsequently in greater detail, is to provide a new telescoping motorcycle helmet lock apparatus and method which has many of the advantages of the helmet locks mentioned heretofore and many novel features that result in a new telescoping motorcycle helmet lock which is not anticipated, rendered obvious, suggested, or even implied by any of the prior art helmet locks, either alone or in any combination thereof.

To attain this, the present invention generally comprises a plurality of rigid semi-circular portions each defined by a 30 degree section of a full sphere. As shown in FIG. 3, each semi-circular portion has an upper edge and a lower edge each with a lip formed thereon. A pair of planar, circular end plates are formed on diametrically opposed points on each semi-circular portion. Such end plates are each rotatably mounted with respect to the end plates of the remaining semi-circular sections. For reasons that will soon become apparent, a hole is formed in at least one end plate of each semi-circular portion at a position different from that of the remaining semi-circular portions. In use, the semi-circular portions have an extended orientation defining a hemispherical cover, as shown in FIGS. 1 & 2. Further, the semi-circular portions have a retracted orientation, wherein each semi-circular portion is in alignment to define a single 30 degree section. Note FIG. 4. It should be noted that the holes of the end are aligned upon the semi-circular portions being in the extended orientation. Next provided is a strap having a pair of ends coupled to the end plates of the semi-circular portions. An intermediate extent of the strap is situated below a seat of a motorcycle. As such, the rigid semi-circular portions are maintained on a rear extent of a seat of the motorcycle. Finally, a locking assembly is mounted on an end plate of an outermost one of the semi-circular portions. The locking assembly preferably includes an inner face with a locking pin adapted to be extended within the holes of the semi-circular portions when in the extended orientation. By this feature, unauthorized access is precluded to a helmet under the hemispherical cover without a key.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telescoping motorcycle helmet lock apparatus and method which has many of the advantages of the helmet locks mentioned heretofore and many novel features that result in a new telescoping motorcycle helmet lock which is not anticipated, rendered obvious, suggested, or even implied by any of the prior art helmet locks, either alone or in any combination thereof.

It is another object of the present invention to provide a new telescoping motorcycle helmet lock which may be easily and efficiently manufactured and marketed.

It is a further object of the present invention to provide a new telescoping motorcycle helmet lock which is of a durable and reliable construction.

An even further object of the present invention is to provide a new telescoping motorcycle helmet lock which is susceptible of a low cost of manufacture with regard to both materials and labor, and which accordingly is then susceptible of low prices of sale to the consuming public, thereby making such telescoping motorcycle helmet lock economically available to the buying public.

Still yet another object of the present invention is to provide a new telescoping motorcycle helmet lock which provides in the apparatuses and methods of the prior art some of the advantages thereof, while simultaneously overcoming some of the disadvantages normally associated therewith.

Still another object of the present invention is to provide a new telescoping motorcycle helmet lock for preventing the theft of a motorcycle helmet from a parked motorcycle.

Even still another object of the present invention is to provide a new telescoping motorcycle helmet lock that includes a plurality of rigid, semi-circular portions each defined by a section of a full sphere. The semi-circular portions have an extended orientation defining a hemispherical cover and an open retracted orientation. A mounting strap is provided for securing the semicircular portions on a seat of a motorcycle. Also included is a locking assembly for preventing unauthorized access under the hemispherical cover.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
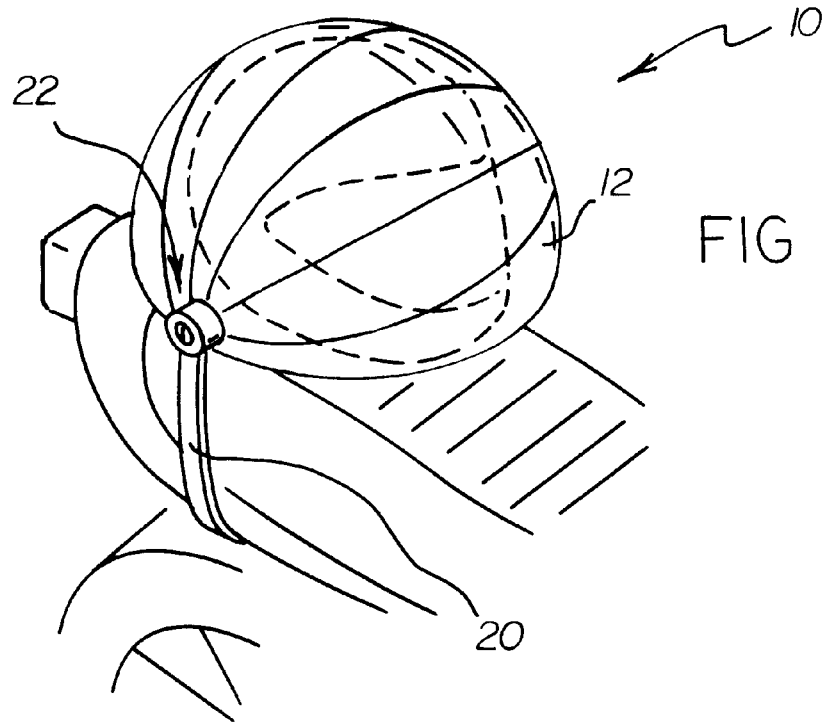
FIG. 1 is a perspective view of a new telescoping motorcycle helmet lock according to the present invention.

With reference now to the drawings, and in particular to FIGS. 1 through 4 thereof, a new telescoping motorcycle helmet lock embodying the principles and concepts of the present invention and generally designated by the reference numeral 10 will be described.

Figure 3:
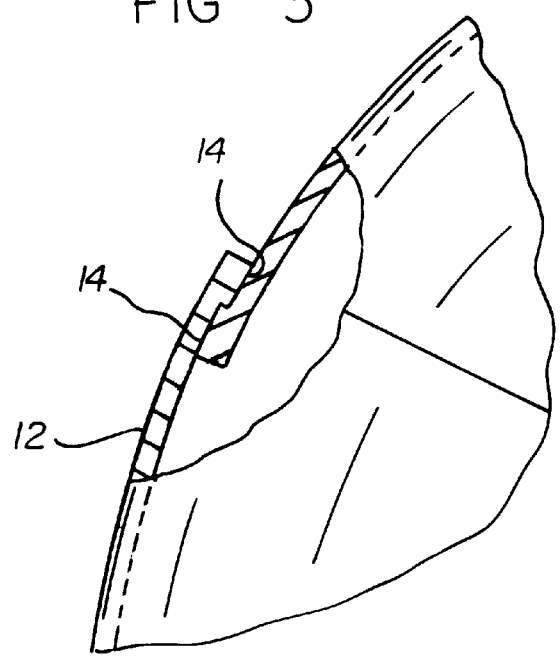
FIG. 3 is a side cross-sectional view of a portion of the present invention encircled in FIG. 2.
Figure 4:
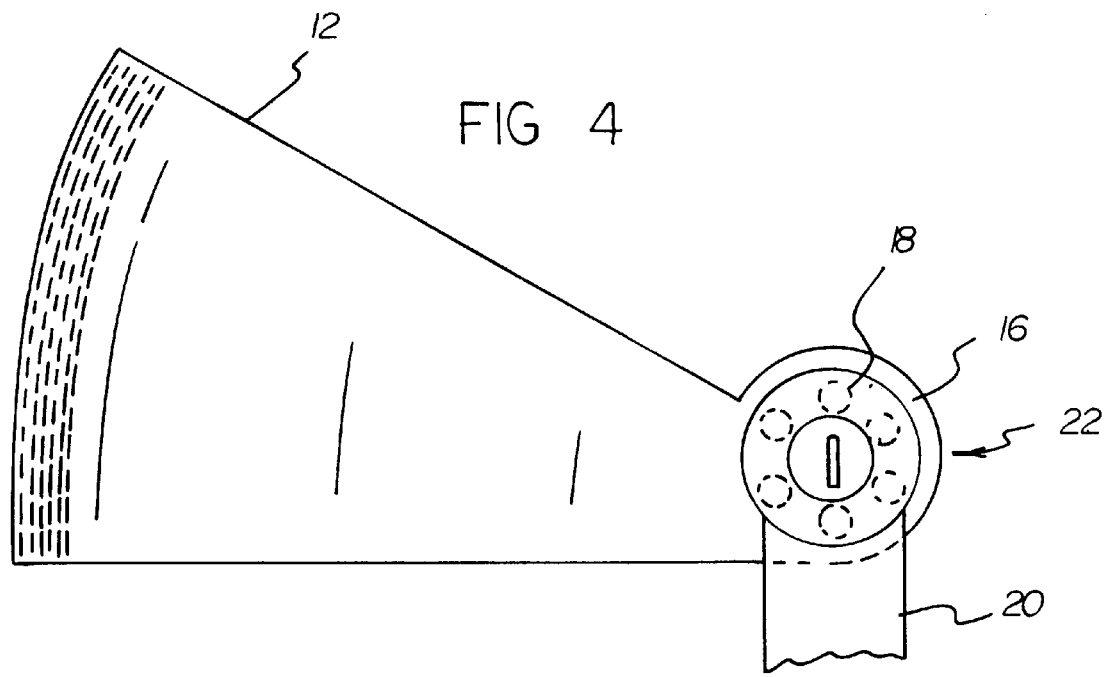
FIG. 4 is a side view of the present invention in the retracted orientation.

The present invention, designated as numeral 10, includes a plurality of rigid semi-circular portions 12 each defined by a 30 degree section of a full sphere. As shown in FIG. 3, each semi-circular portion has an upper edge and a lower edge each with a lip 14 formed thereon. It should be noted that the lip of the upper edge extends inwardly whereas the lip of the lower edge extends outwardly. A pair of planar, circular end plates 16 are integrally formed on diametrically opposed points on each semi-circular portion. Such end plates are each rotatably mounted with respect to the end plates of the remaining semi-circular sections. Such rotatable coupling may be accomplished by any desired means such as an annular slot and groove combination. For reasons that will soon become apparent, a hole 18 is formed in at least one end plate of each semi-circular portion at a position different from that of the remaining semi-circular portions.

Figure 2:
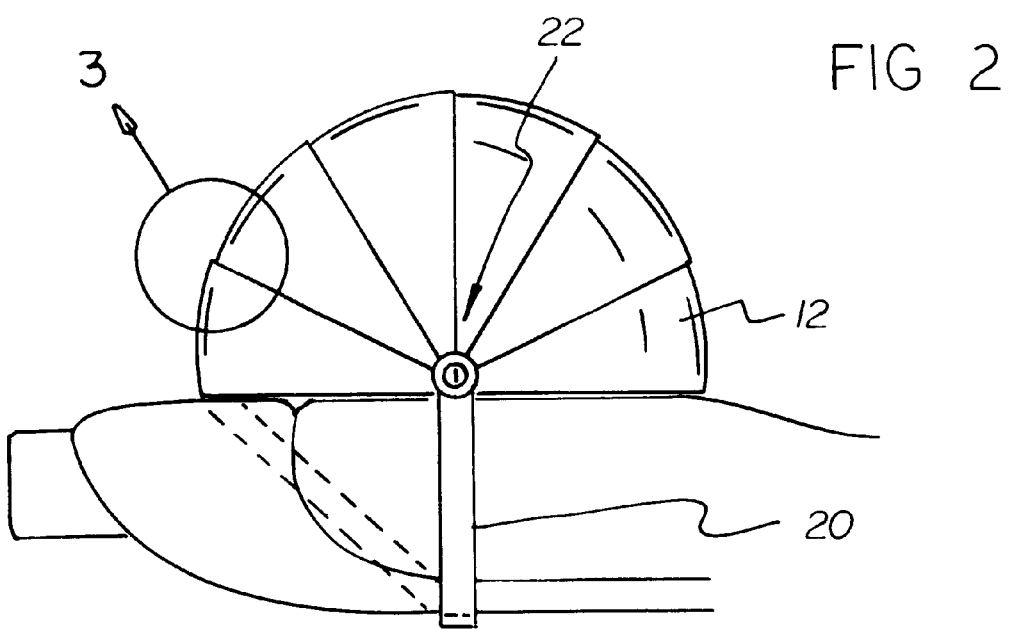
FIG. 2 is a side view of the present invention.

In use, the semi-circular portions have an extended orientation defining a hemispherical cover, as shown in FIGS. 1 & 2. Further, the semi-circular portions have a retracted orientation, wherein each semi-circular portion is in alignment to define a single 30 degree section. Note FIG. 4. Preferably, the semicircular portions are adapted to retract rearwardly so as to not interfere with a rider of the motorcycle during use. In other words, the semi-circular portions open towards the front of the motorcycle. It should be noted that the holes of the end are aligned upon the semi-circular portions being in the extended orientation.

Next provided is a strap 20 having a pair of ends coupled to the end plates of the semi-circular portions. An intermediate extent of the strap is situated and coupled below a seat of a motorcycle. As such, the rigid semi-circular portions are maintained on a rear extent of a seat of the motorcycle. In the preferred embodiment, the strap is constructed from a metallic material or the like that can not be severed or removed.

As shown in FIG. 2, the strap may be situated vertically or at a rearward angle such that the present invention is positioned as far back as possible. It is imperative that it be understood that the present invention is to be mounted as close to the rear of the motorcycle as will be permitted. In the alternative, the present invention may be mounted in other locations on the bike. For example, the semi-circular portions of the present invention may be mounted at a front of the motorcycle and open towards the rear.

Finally, a locking assembly 22 is mounted on an end plate of an outermost one of the semi-circular portions. The locking assembly preferably includes an inner face with a locking pin adapted to be extended within the holes of the semi-circular portions when in the extended orientation. By this feature, unauthorized access to a helmet under the hemispherical cover is precluded without a key. During use, the locking pin is adapted to automatically insert within the holes when aligned. Further, the locking pin may be removed by inserting the key within a slot formed in an outer face of the locking assembly and subsequently rotating the same.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A helmet restraining and locking device comprising, in combination:

a plurality of rigid semi-circular portions each defined by a 30 degree section of a full sphere, each semi-circular portion having an upper edge and a lower edge each with a lip formed thereon, a pair of planar, circular end plates formed on diametrically opposed points on each semi-circular portion which are each rotatably mounted with respect to the end plates of the remaining semi-circular portions, a hole formed in at least one end plate of each semi-circular portion at a position different from that of the remaining semi-circular portions, wherein the semi-circular portions have an extended orientation defining a hemispherical cover and a retracted orientation, whereby the holes of the end are aligned upon the semi-circular portions being in the extended orientation;

a strap having a pair of ends coupled to the end plates of the semi-circular portions and an intermediate extent situated below a seat of a motorcycle such that the rigid semi-circular portions are maintained on a rear extent of a seat of the motorcycle; and a locking assembly mounted on an end plate of an outermost one of the semi-circular portions and including an inner face with a locking pin adapted to be extended within the holes of the semicircular portions when in the extended orientation, thereby precluding access to a helmet under the hemispherical cover without a key.

2. A helmet restraining and locking device for mounting on the seat of a motorcycle and selectively precluding access to a helmet, the device comprising:

a plurality of panels, each of the panels defining a section of a hemisphere when the panels are in a closed orientation, wherein the panels in the closed orientation form an continuous hemispherical wall enclosing an interior adapted for accepting the helmet, the plurality of panels each having opposite ends being pivotally connected together such that each of the panels pivots about a common axis, the plurality of panels being pivotable into an open retracted orientation wherein at least one of the panels is nested in another of the panels such that the plurality of panels occupy a fractional portion of the hemisphere for permitting removal of the helmet from the interior;

mounting means for securing the plurality of panels on a motorcycle; and locking means for selectively locking the plurality of panels in the closed orientation and resisting movement of the panels into the open orientation.

3. A helmet restraining and locking device as set forth in claim 2 wherein the mounting means includes a strap having a pair of ends coupled to the ends of the panels and an intermediate extent positionable below a seat of a motorcycle such that the panels are maintained on top of a rear extent of the seat of the motorcycle.

4. A helmet restraining and locking device as set forth in claim 2 wherein each semi-circular portion has an upper and lower edge with a lip, the lip on the upper edge of one of the panels being abuttable with the lip on the lower edge of an adjacent one of the panels the lip on the lower edge being located on an oter surface of the panels and the lip on the upper edge being located on an inner surface of the panel.

5. A helmet restraining and locking device as set forth in claim 2 wherein the locking means includes a locking pin removably inserted with aligned bores formed in one of the ends of the plurality of panels.

6. A helmet restraining and locking device comprising:

a plurality of substantially rigid semi-circular portions, each semi-circular portion having an upper edge and a lower edge each with a lip formed thereon, a pair of end plates formed on opposed points on each semi-circular portion, each of the semi-circular portions being rotatably mounted with respect to the end plates of the remaining semi-circular portions, a hole formed in at least one end plate of each semi-circular portion at a position different from that of the remaining semi-circular portions, wherein the semicircular portions have an extended orientation defining a closed orientation and a retracted orientation, wherein the holes of the end plates are aligned upon the semi-circular portions being in the extended orientation;

a strap having a pair of ends coupled to the end plates of the semi-circular portions and an intermediate extent for positioning below a seat of a motorcycle such that the rigid semi-circular portions are maintained on the seat of the motorcycle; and a locking assembly mounted on an end plate of an outermost one of the semi-circular portions, the locking assembly including an inner face with a locking pin adapted to be extended into the holes of the semi-circular portions when in the extended orientation for selectively precluding access to a helmet when positioned under the semi-circular portions.

7. A helmet restraining and locking device as set forth in claim 2 wherein the plurality of panels includes six panels, and wherein each of the panels extends over an area occupying approximately one sixth of an area of a hemisphere.

* * * * *